(12) United States Patent
Gil et al.

(10) Patent No.: US 10,142,267 B2
(45) Date of Patent: *Nov. 27, 2018

(54) METHOD FOR TRACKING AND ROUTING FINANCIAL MESSAGES FOR MOBILE DEVICES

(71) Applicant: Bottomline Technologies (DE), Inc., Portsmouth, NH (US)

(72) Inventors: Leo Gil, Derry, NH (US); Matthew Doherty, Rye, NH (US); Brian Smith Mclaughlin, Portland, ME (US)

(73) Assignee: BOTTOMLINE TECHNOLOGIES (DE) INC., Portsmouth, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 15/894,308

(22) Filed: Feb. 12, 2018

(65) Prior Publication Data

US 2018/0176161 A1 Jun. 21, 2018

Related U.S. Application Data

(63) Continuation of application No. 14/489,509, filed on Sep. 18, 2014, now Pat. No. 9,929,988.

(51) Int. Cl.
*H04L 12/58* (2006.01)
*G06Q 40/02* (2012.01)

(52) U.S. Cl.
CPC ........... *H04L 51/046* (2013.01); *G06Q 40/02* (2013.01); *H04L 51/18* (2013.01)

(58) Field of Classification Search
CPC ........ H04L 51/046; H04L 51/18; G06Q 40/02

USPC ........................................................ 709/206
See application file for complete search history.

(56) References Cited

U.S. PATENT DOCUMENTS

| | | | |
|---|---|---|---|
| 6,856,970 B1 | 2/2005 | Campbell | |
| 7,200,149 B1 | 4/2007 | Hasty, Jr. | |
| 8,046,336 B1 | 10/2011 | Zhang | |
| 8,266,115 B1 | 9/2012 | Park | |
| 9,299,241 B1 | 3/2016 | Monical | |
| 2003/0217150 A1* | 11/2003 | Roese | G01S 5/02 709/225 |
| 2007/0055672 A1 | 3/2007 | Stevens | |
| 2007/0295803 A1 | 12/2007 | Levine | |
| 2008/0186853 A1* | 8/2008 | Archer | H04L 45/02 370/235 |
| 2009/0271862 A1 | 10/2009 | Allen | |
| 2010/0211499 A1 | 8/2010 | Zanzot | |
| 2011/0038254 A1* | 2/2011 | Hashiguchi | H04L 45/1283 370/217 |
| 2012/0149405 A1 | 6/2012 | Bhat | |
| 2012/0278898 A1 | 11/2012 | Nguyen | |
| 2013/0311420 A1 | 11/2013 | Tehranchi | |
| 2013/0346521 A1 | 12/2013 | Arabo | |
| 2014/0171135 A1* | 6/2014 | Fan | H04W 4/12 455/466 |
| 2014/0241173 A1* | 8/2014 | Knight | H04M 7/0075 370/248 |
| 2017/0289106 A1* | 10/2017 | Chen | H04L 63/0263 |

* cited by examiner

*Primary Examiner* — James E Springer
(74) *Attorney, Agent, or Firm* — Renner, Otto, Boisselle & Sklar, LLP

(57) ABSTRACT

A financial messaging apparatus configured to encapsulate and transmit a financial message along with actions to a mobile device. The actions relate to rules that are associated with characteristics of the financial message.

22 Claims, 5 Drawing Sheets

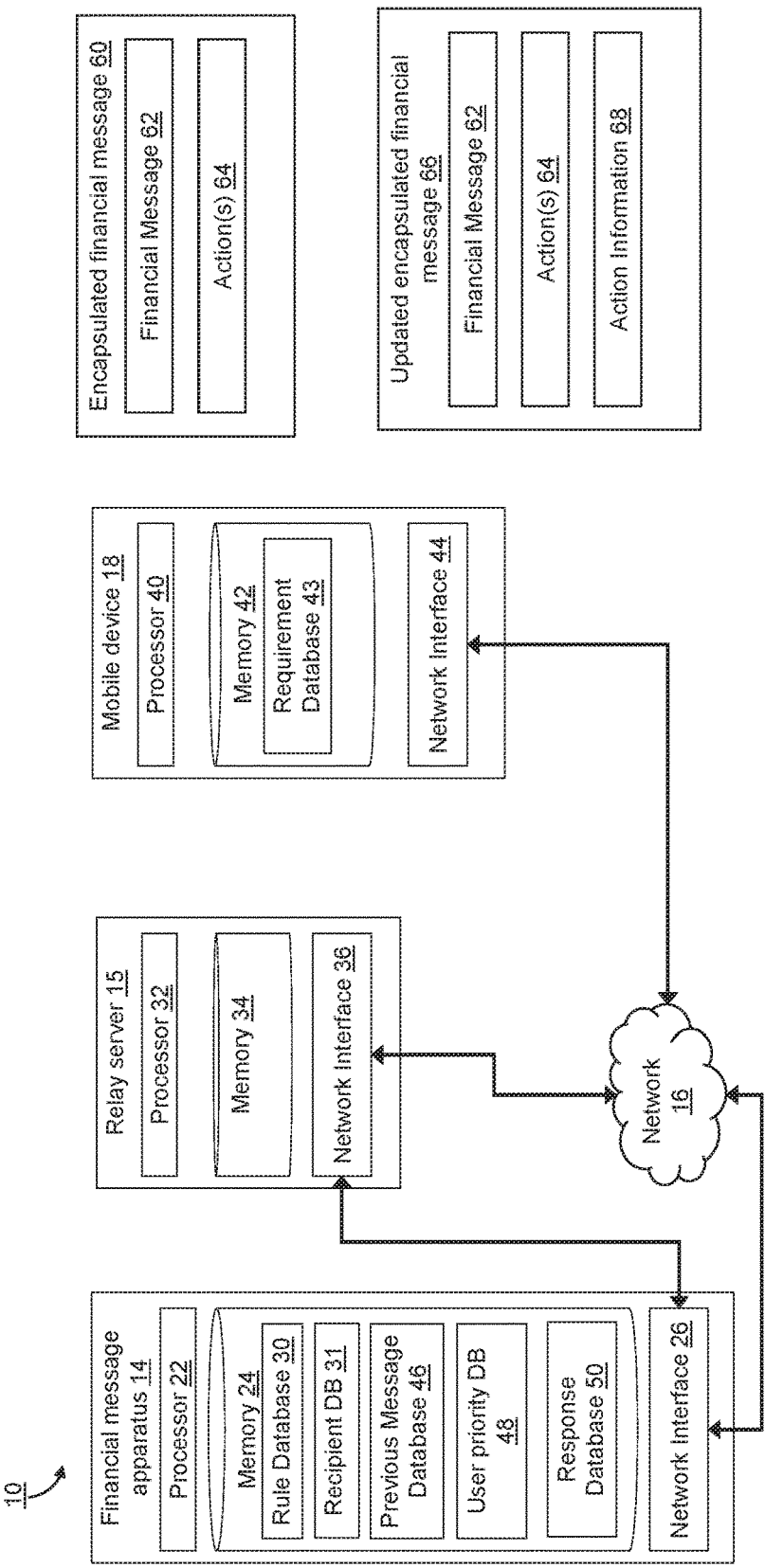

METHOD FOR TRACKING AND ROUTING FINANCIAL MESSAGES FOR MOBILE DEVICES

TECHNICAL FIELD

The present invention relates to the delivery and routing of financial messages, more particularly, to a method and system for encapsulating financial messages.

BACKGROUND OF THE INVENTION

Large volumes of financial messages are routinely sent between banks and large corporations. The financial messages are used by banks to perform, e.g., funds transfers, real time gross settlement, centralized funds management, etc.

SUMMARY OF THE INVENTION

The convenience of viewing and responding to financial messages can be improved by allowing users to manage financial messages with their mobile devices. In order to improve a user's ability to view financial messages using a mobile device, the transmission of financial messages needs to be updated in order to fully leverage the limited capabilities of mobile devices. That is, an improved method for transmitting financial messages is needed that leverages the location awareness of mobile devices and best utilizes the limited display size of mobile devices.

The present disclosure provides a financial messaging apparatus configured to encapsulate and transmit a financial message along with actions to be performed by a receiving mobile device. The actions are chosen based on the characteristics of the financial message and the intended recipient of the financial message.

According to one aspect of the disclosure, there is provided a financial messaging apparatus configured to encapsulate a financial message. The apparatus includes a network interface configured to receive a financial message generated by a bank and a non-transitory computer readable medium configured to store a rule database. The rule database includes rules specifying actions to be added to financial messages based upon characteristics of the financial messages. The apparatus also includes a processor configured to: analyze the received financial message to identify at least one characteristic of the received financial message, identify at least one rule in the rule database matching at least one of the at least one identified characteristics of the received financial message, combine at least one action specified by the identified at least one rule with the financial message to form an encapsulated financial message, and identify a user associated with the received financial message. The network interface further configured to transmit the encapsulated financial message to the identified user.

Alternatively or additionally, the actions stored in the encapsulated financial message include an access rule specifying criteria for accessing the financial message stored in the encapsulated financial message.

Alternatively or additionally, the access rule prevents the financial message stored in the encapsulated financial message from being accessed unless a location of a receiver of the encapsulated financial message is within a specified geo-location.

Alternatively or additionally, the network interface transmits the encapsulated financial message to a relay server as part of transmitting the encapsulated financial message to the identified user and the access rule contains information configured to prevent the relay server from transmitting the encapsulated financial message outside of a specified geo-location contained in the access rule.

Alternatively or additionally, the specified geo-location is the United States of America.

Alternatively or additionally, the action stored in the encapsulated financial message include a routing rule specifying criteria for routing of the encapsulated financial message.

Alternatively or additionally, the routing rule specifies at least one preferred location for routing the encapsulated financial message through and/or at least one prohibited location for routing the encapsulated financial message through. The encapsulated financial message is prevented from being routed through the at least one prohibited location. The network interface transmits the encapsulated financial message to the identified user through the at least one preferred location if routing through the at least one preferred location is available. The network interface does not transmit the encapsulated financial message through the at least one prohibited location.

Alternatively or additionally, the actions stored in the encapsulated financial message include a duplicative message rule specifying that a priority of the encapsulated financial message is updated if the financial message stored in the encapsulated financial message has already been displayed to the identified user.

Alternatively or additionally, the actions stored in the encapsulated financial message include a duplicative message rule specifying that a priority of the encapsulated financial message is modified if the financial message stored in the encapsulated financial message has already been transmitted to the identified user. The non-transitory computer readable medium additionally includes a previous message database identifying the transmitted financial message that have been previously sent to the identified user.

Alternatively or additionally, a priority of the encapsulated financial message is increased if the financial message stored in the encapsulated financial message has already been transmitted to the identified user.

Alternatively or additionally, the actions stored in the encapsulated financial message include a priority and the financial message stored in the encapsulated financial message is not displayed to the identified user upon receiving the encapsulated financial message if the priority of the encapsulated financial message does not meet or exceed a priority threshold of the identified user.

Alternatively or additionally, the actions stored in the encapsulated financial message include a priority. The non-transitory computer readable medium additionally includes a user priority database identifying a priority threshold associated with the identified user. The network interface is further configured to only transmit the encapsulated financial message if the priority of the encapsulated financial message does not meet or exceed the priority threshold associated with the identified user.

Alternatively or additionally, the actions stored in the encapsulated financial message include a priority and a network protocol that the network interface uses to transmit the encapsulated financial message to a user depends on the priority of the encapsulated financial message.

Alternatively or additionally, the network protocol used to transmit an encapsulated financial message having a high priority is a push notification.

Alternatively or additionally, the actions stored in the encapsulated financial message include an error flag identifying the financial message stored in the encapsulated financial message as containing information regarding an error and the financial message stored in the encapsulated financial message is automatically displayed to the identified user upon receiving the encapsulated financial message.

Alternatively or additionally, the received financial message has a designated format and the designated format of the financial message is SWIFT or BACS.

According to another aspect of the disclosure, there is provided a financial message system including the financial message apparatus and a mobile device. The mobile device includes a network interface configured to receive the encapsulated financial message from the financial message apparatus and a processor. The processor is configured to determine the at least one action stored in the received encapsulated financial message and perform the determined at least one action.

Alternatively or additionally, the mobile device additionally comprises a non-transitory computer readable medium configured to store a requirement database, wherein the requirement database stores at least one requirement specifying an operation to be performed based upon at least one characteristic of received encapsulated financial messages. Prior to performing the determined at least one action, the processor of the mobile device is further configured to analyze the received encapsulated financial message to identify at least one characteristic of the received encapsulated financial message and identify at least one operation in the requirement database matching at least one of the at least one identified characteristics of the received encapsulated financial message. The processor of the mobile device only performs the determined at least one action if the determined at least one action does not conflict with the identified at least one operation.

Alternatively or additionally, the requirement database stores a duplicate requirement specifying that a priority of financial messages already displayed is modified. If the processor of the mobile device identifies the encapsulated financial message as a duplicate message, the processor of the mobile device modifies the priority of the received duplicate financial message included in the encapsulated financial message due to the duplicate requirement and updates the encapsulated financial message to include action information identifying that the priority of the financial message in the encapsulated financial message was modified.

Alternatively or additionally, the processor of the mobile device is further configured to update the encapsulated financial message by including action information in the encapsulated financial message. The action information identifies an operation regarding the financial message of the encapsulated financial message. The network interface is further configured to transmit the updated encapsulated financial message to the financial message apparatus. The network interface of the financial message apparatus is further configured to receive the updated encapsulated financial message from the mobile device.

Alternatively or additionally, the financial message apparatus additionally includes the non-transitory computer readable medium additionally configured to store a response database. The response database stores at least one response specifying a response action to be performed based upon at least one action information in the received updated encapsulated financial messages. The processor is further configured to: analyze the received updated encapsulated financial message to identify at least one action information in the received updated encapsulated financial messages, identify at least one response in the response database matching at least one of the at least one identified action information, and perform the identified at least one response.

Alternatively or additionally, the financial message in the encapsulated financial message indicates a violation. The action included in the received encapsulated financial message indicates displaying the financial message in the encapsulated financial message and requesting user input identifying a fix of the violation. The processor of the mobile device: causes the financial message in the encapsulated financial message indicating the violation to be displayed, receives user input identifying an identified fix of the violation, updates the encapsulated financial message to include action information identifying the identified fix and that the encapsulated financial message was updated by the mobile device. The network interface of the mobile device transmits the updated encapsulated financial message to the financial message apparatus.

According to a further aspect of the disclosure, there is provided a financial message system additionally including a relay server. The relay server includes a network interface configured to: receive the encapsulated financial message from the financial message apparatus, transmit the encapsulated financial message to the identified user, and receive information regarding the identified user. The relay server also includes a processor configured to: access the at least one action included in the encapsulated financial message and analyze the at least one action for a restriction on routing of the encapsulated financial message. If the at least one action does not contain at least one routing restriction, the processor causes the network interface to transmit the encapsulated financial message to the identified user. If the at least one action contains at least one routing restriction, the processor determines if the received information regarding the identified user conflict with the at least one routing restriction. If the received information regarding the identified user does not conflict with the at least one routing restriction, the processor cause the network interface to transmit the encapsulated financial message to the identified user. If the received information regarding the identified user does conflict with the at least one routing restriction, the processor prevents the network interface to transmit the encapsulated financial message to the identified user.

According to an additional aspect of the disclosure, there is provided a method for encapsulating a financial message. The method includes receiving a financial message generated by a bank, analyzing the received financial message to identify at least one characteristic of the received financial message, and identifying at least one rule in a rule database matching at least one of the at least one identified characteristics of the received financial message. The rule database is stored on a non-transitory computer readable medium and the rule database includes rules specifying actions to be added to financial messages based upon characteristics of the financial messages. The method also includes combining at least one action specified by the identified at least one rule with the financial message to form an encapsulated financial message, identifying a user associated with the received financial message, and transmitting the encapsulated financial message to the identified user.

A number of features are described herein with respect to embodiments of this disclosure. Features described with respect to a given embodiment also may be employed in connection with other embodiments.

For a better understanding of the present disclosure, together with other and further aspects thereof, reference is made to the following description, taken in conjunction with the accompanying drawings. The scope of the disclosure is set forth in the appended claims, which set forth in detail certain illustrative embodiments. These embodiments are indicative, however, of but a few of the various ways in which the principles of the disclosure may be employed.

BRIEF DESCRIPTION OF THE DRAWINGS

FIG. 2 is a block diagram of a financial messaging system.

FIG. 3 is a block diagram of an encapsulated financial message and an updated encapsulated financial message.

DETAILED DESCRIPTION OF THE INVENTION

Figure 1:
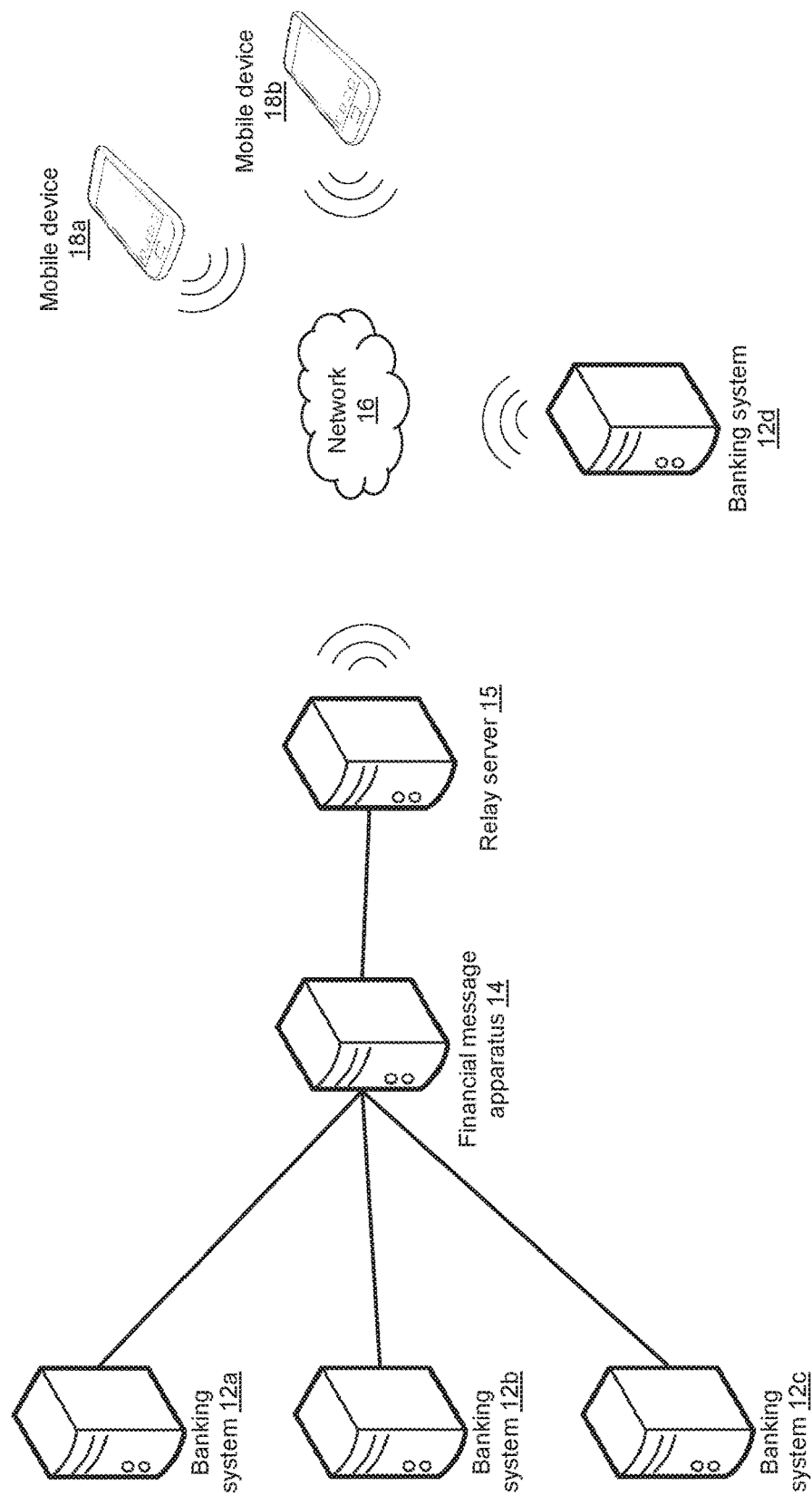
FIG. 1 is a block diagram representing transmission of a financial message through a system including a financial messaging system.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should be appreciated that many of the elements discussed in this specification may be implemented in a hardware circuit(s), a processor executing software code or instructions which are encoded within computer readable media accessible to the processor, or a combination of a hardware circuit(s) and a processor or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a processor or control block executing code encoded in a computer readable media, or a combination of a hardware circuit(s) and a processor and/or control block executing such code.

The present disclosure provides a financial messaging apparatus configured to encapsulate and transmit a financial message along with actions to a mobile device. The actions relate to rules that are associated with characteristics of the financial message. The encapsulated financial message (including the financial message and actions) are transmitted together from the financial messaging apparatus to a mobile device.

FIG. 1 depicts communication between banking systems 12a-c, financial messaging apparatus 14, and mobile devices 18a,b. The financial messaging apparatus 14 receives financial messages from the banking systems 12a-12c intended for users of mobile devices 18a-18b. Upon receiving a financial message, the financial messaging apparatus 14 encapsulates the financial message and transmits the encapsulated financial message to a mobile device 18 via a network 16. The financial messaging apparatus 14 may transmit the encapsulated financial message to the intended mobile device 18 via a relay server 15.

As shown in FIG. 1, the financial messaging apparatus 14 is not limited to transmitting financial messages to mobile devices 18a-18b, but may also transmit financial messages to other banking systems 12d. The financial messaging apparatus 14 may also receive an updated encapsulated financial message from the mobile device 18. Depending upon the contents of the updated encapsulated financial message, the financial messaging apparatus 14 may then transmit the updated encapsulated financial message to one or more banking systems 12a-c.

The financial messages may be sent within a bank (inter-bank financial messages) or between banks (intra-bank financial messages) to perform, e.g., funds transfers, real time gross settlement, centralized funds management, etc. Financial messages may also be sent to corporate customers to, e.g., report the status of transactions or identify faults, errors, and violations. The characteristics of a financial message may depend on the financial system that the message is compliant with. For example, a SWIFT message may have different characteristics than a BACS message. Some example characteristics of financial messages are duplicate (e.g., indicating that the message has previously been received), error (e.g., due to a system failure that generates an incomplete message), violation (e.g., making a payment for a company listed as a terrorist organization), confirmation (e.g., indicating that the message was received by the receiving party), or requires user action (e.g., indicating that user intervention is required to process the message). For example, a financial message may have a "requires user action" status due to a financial message being sent to a small bank without a bank identification code (BIC). In such a case, the bank information for the recipient of the financial message may be required to be verified by a user. Upon verification by a qualified user, the financial message may be sent from the user to the financial messaging apparatus 14 and from the financial message 14 to a banking system 12.

As will be understood by one of ordinary skill in the art, the transmission of financial messages, encapsulated financial messages, and updated encapsulated financial messages may be transmitted using any suitable protocol (e.g., TCP/IP, Bluetooth, SMTP, HTTP, SSL, PPP, IMAP, or any other suitable network protocol).

Turning to FIG. 2, a financial messaging system 10 is shown. The system 10 includes a financial messaging apparatus 14 and a mobile device 18. The system 10 may also include a relay server 15. The financial messaging apparatus 14 receives financial messages from banking systems 12 via a network interface 26. For example, the financial messaging apparatus 14 may receive a financial message from a banking system 12 to a user indicating that a funds transfer was successfully performed. As will be described in greater detail below, a processor 22 of the financial messaging apparatus 14 combines the financial message with actions contained in a rule database stored in a non-transitory computer readable medium 24 of the financial messaging apparatus 14. The actions combined with the financial message are selected based on the characteristics of the received financial message. That is, after determining the characteristics of the financial message (e.g., the type of message, the subject of the message, who the message was from, etc.) the processor 22 of the financial message 14 identifies rules in the rule database corresponding to the identified characteristics of the financial message. For example, if the financial message is regarding a transaction over $100,000 and there is a rule in the rule database 30 specifying that financial messages regarding transactions over $50,000 have a high priority, then the financial message will be combined with an action item identifying the financial message as having a high priority. The encapsulated financial message is then transmitted by the network interface 26 of the financial messaging apparatus 14 to the mobile device 18 via the network 16. In some embodiments, the financial messaging apparatus 14 first transmits the encapsulated financial message to a relay server 15 which then transfers the encapsulated financial message to the mobile device 18.

The financial messaging apparatus 14 and relay server 15 may be a computer system of one or more servers. The mobile device 18 may comprise a cellular phone, smart phone, tablet, or other suitable mobile computer capable of sending and receiving financial messages. The financial messaging apparatus 14, relay server 15, and mobile device each include at least a processor, a network interface, and non-transitory computer readable medium. The computer readable medium may include encoded thereon instructions for interfacing with the corresponding network interface and reading and writing data to the corresponding computer readable medium. The computer readable medium may also include computer programs comprising instructions embodied thereon that are executed by the corresponding processor.

Turning to FIG. 3, an exemplary encapsulated financial message 60 and updated encapsulated financial message 66 are shown. The encapsulated financial message 60 includes a financial message 62 and at least one action 64. As described above, the encapsulated financial message 60 is formed when the received financial message is combined with at least one action 64 by the processor 22 of the financial messaging apparatus 14. The encapsulated financial message 60 may comprise a single data structure or separate but linked data structures. For example, the financial message 62 and action(s) 64 may be included in a container that ensures the financial message 62 and action(s) 64 are transmitted together by the financial messaging apparatus 14.

The encapsulated financial message 60 is not limited to containing a single financial message 62, but may contain multiple financial messages 62. In one example, the financial messages 62 contained in the encapsulated financial message 60 may all be related. For example, if the encapsulated financial message 60 contains a duplicate financial message 62, then the encapsulated financial message 60 may include the duplicate financial message and the original financial message. In another example, the encapsulated financial message 60 may contain a financial message 62 indicating a funds transfer was successfully performed. In this example, the encapsulated financial message 60 may also include the original financial message 62 that ordered the funds transfer be performed. In still another example, an encapsulated financial message 60 may include multiple unrelated financial message s 62.

The at least one action 64 included in the encapsulated financial message 60 is selected by the processor 22 based on at least one characteristic of the received financial message 62. That is, the processor 22 first analyzes the received financial message to identify at least one characteristic of the received financial message 60. The processor 22 then identifies at least one rule in the rule database matching at least one of the identified characteristics of the received financial message 62. The rule database 30 includes rules specifying actions to be added to financial messages 62 based upon characteristics of the financial messages 62. The action(s) specified by the identified rule(s) are then combined with the financial message 62 to form the encapsulated financial message 60.

The received financial message 62 may have a designated format defined by a financial network. For example, the financial network may be SWIFT, BACS, FIN, SWIFT emulation, InterAct, FileAct, EBICS, SIC-SECOM, FIX, BT, or any other suitable financial network. Actions 64 added to the financial message (62) may indicate processes to be performed by the mobile device 18 upon receipt of the encapsulated financial message 60. Exemplary actions include cancel payment, resend payment, verify information, change priority, etc.

After generating the encapsulated financial message 60, the processor 22 identifies a user associated with the received financial message 62. The user associated with the financial message 62 may be identified by analyzing the contents of the financial message 62. For example, the financial message 62 may include a field identifying an intended recipient of the financial message 62. The processor 22 may compare the intended recipient with a recipient database 31 stored on the non-transitory computer readable medium 24. The recipient database 31 identifies individual users associated with intended recipients. For example, a financial message 62 may identify Acme Corporation as an intended recipient. Acme Corporations entry in the recipient database 31 may identify its CFO as the user selected to receive all financial messages 62. Thus, if a financial message identifies Acme Corporation as the intended recipient, then the CFO would be identified as the user associated with the received financial message. The network interface 26 of the financial messaging apparatus 14 is configured to transmit the encapsulated financial message 60 to the identified user (i.e., the Acme Corporation's CFO in the current example).

Figure 4:
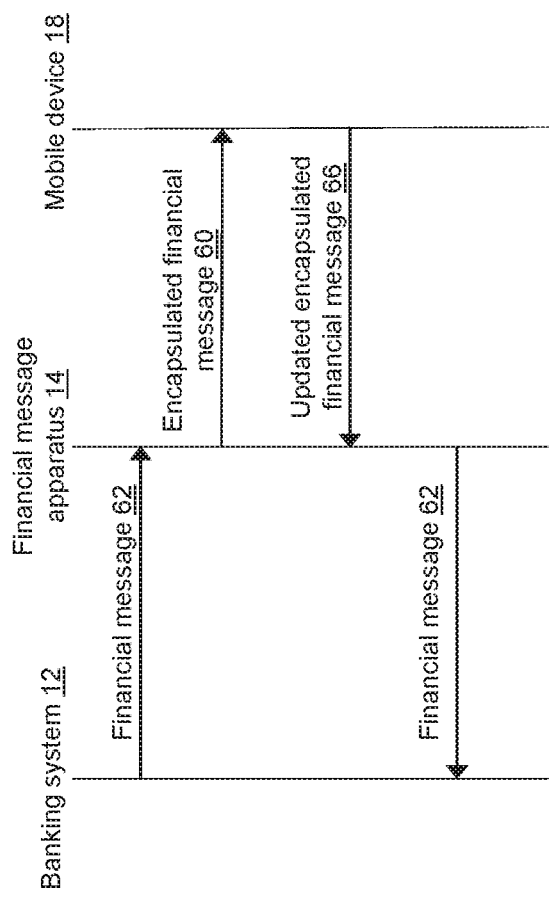
FIG. 4 is a ladder diagram representing transmission of financial messages within the financial messaging system.

Turning to FIG. 4, a ladder diagram depicts the movement of encapsulated financial messages 60, financial messages 62, and updated encapsulated financial messages 66 between the banking system 12, financial messaging apparatus 14, and mobile device 18. As discussed above, the financial messaging apparatus 14 receives a financial message 62 from a banking system 12. The financial messaging apparatus 14 combines the financial message 62 with specified actions depending on the characteristics of the financial message 62. The financial messaging apparatus 14 then transmits the encapsulated financial message 60 to a user associated with the financial message 62. For example, the financial messaging apparatus 14 may transmit the encapsulated financial message 60 to the user's mobile device 18.

Mobile devices 18 have potential security risks when located in foreign countries (e.g., due to insecure or unreliable internet access). For this reason, actions stored in the encapsulated financial message 60 may include an access rule specifying criteria for accessing the financial message 62 stored in the encapsulated financial message 60. For example, the access rule may prevent the financial message 62 stored in the encapsulated financial message 60 from being accessed unless a location of a receiver of the encapsulated financial message is within a specified geo-location (e.g., the United States of America, the United Kingdom, Australia, etc.).

As an example if the CFO of Acme Corporation is traveling abroad visiting facilities in developing countries, it may be preferable to prevent the CFO from receiving and/or opening financial messages 62. In one embodiment, the encapsulated financial message 60 is received by the CFO's mobile device 18 when located abroad. Upon receiving the encapsulated financial message 60 (as is described in further detail below), the processor 40 of the mobile device 18 determines the action(s) 64 stored in the received encapsulated financial message 60. If an action 64 restricts display of the financial message 62 to locations within the USA, the processor 40 of the mobile device 18 will check the current location of the mobile device 18. Because the mobile device 18 is located outside of the USA, the received encapsulated financial message 60 is not displayed to the CFO. The processor 40 of the mobile device 18 may update the encapsulated financial message 60 to include action information 68 stating that the encapsulated financial message 60 was not displayed, because the mobile device 18 was located outside of the specified geo-location. The network interface 44 of the mobile device 18 may then transmit the updated encapsulated financial message 66 to the financial messaging apparatus 14.

In an alternative embodiment, the encapsulated financial message 60 may never be received by the CFO's mobile device 18. That is, as opposed to transmitting the encapsulated financial message 60 directly to the mobile device 18, the financial messaging apparatus 14 may first transmit the encapsulated financial message 60 to a relay server 15 as part of transmitting the encapsulated financial message to the identified user. In this example, the access rule contains information configured to prevent the relay server 15 from transmitting the encapsulated financial message 60 outside of the specified geo-location contained in the access rule. Thus, as opposed to the previous embodiment, the mobile device 18 never receives the encapsulated financial message 60 as the relay server 15 does not transmit the encapsulated financial message 60 to the mobile device 18. In this example, the relay server 15 may update the encapsulated financial message 60 to indicate that it was not forwarded to the mobile device 18. Alternatively, the relay server 15 may send a separate message to the financial messaging apparatus 14 indicating that the encapsulated financial message 60 was not sent to the identified user.

The processor 40 of the mobile device 18 may identify the location of the mobile device 18 using a global positioning system (GPS) device, cellular triangulation, WI-FI positioning, or any other suitable technique or device to determine the location of a mobile device 18.

In another example, an encapsulated financial message 60 may store an action including a routing rule specifying criteria for routing of the encapsulated financial message 60. The routing rule may specify at least one preferred location for routing the encapsulated financial message through and/or at least one prohibited location for routing the encapsulated financial message 60 through. For example, the financial messaging apparatus 14 may have a choice between two relay servers 15 when transmitting the encapsulated financial message 60 to a user. The action 64 contained in the encapsulated financial message 60 may identify one of the relay server 15 as a prohibited location and the other relay server 15 as a preferred location. In this example, the encapsulated financial message 60 is prevented from being routed through the at least one prohibited location and, therefore, the network interface 26 does not transmit the encapsulated financial message 60 through the at least one prohibited location. Instead, the network interface 26 transmits the encapsulated financial message 60 to the identified user through the at least one preferred location if routing through the at least one preferred location is available. For example, when routing an encapsulated financial message 60 to a user in a foreign country, the encapsulated financial message 60 may be prevented from passing through specific foreign countries due to risks caused by hackers, unreliable internet connectivity, and/or government spying.

In a further example, the actions stored in the encapsulated financial message 60 may include a duplicative message rule specifying that a priority of the encapsulated financial message 60 is updated if the financial message 62 stored in the encapsulated financial message 60 has already been displayed and/or transmitted to the identified user. For example, a priority of the encapsulated financial message 60 may be increased if the financial message 62 stored in the encapsulated financial message 60 has already been transmitted to the identified user. Duplicate financial message 62 may indicate an inadvertent double payment or a system error causing two financial messages to be received for a single transaction. In this case, the priority of the financial message 62 will be increased to ensure that the financial message 62 is displayed to the user. Alternatively, the priority of duplicate financial messages 62 may be decreased for users that frequently receive duplicate financial messages 62. For example, the priority of duplicate financial messages may be reduced such that the duplicate financial messages 62 are not displayed.

The processor 22 of the financial messaging apparatus 14 may identify duplicate messages using a previous message database 46 identifying the transmitted financial messages 62 that have previously been sent to the identified user. The previous message database 46 may be stored on the non-transitory computer readable medium 24 of the financial messaging apparatus 14. Alternatively, the previous message database 42 may be stored on the non-transitory computer readable medium 42 of the mobile device 18 and the processor 40 of the mobile device 18 may detect that the financial message 62 is a duplicate. The processor 40 may then, e.g., alter the priority of the financial message 62 as described above.

In a further example, an encapsulated financial message 60 may store an action including a priority. If the priority of the encapsulated financial message 62 does not meet or exceed a priority threshold of the identified user, the financial message 62 stored in the encapsulated financial message 60 is not displayed to the identified user upon receiving the encapsulated financial message 60. For example, the non-transitory computer readable medium 24 of the financial messaging apparatus 14 may additionally include a user priority database 48 identifying a priority threshold associated with the identified user. The network interface 26 of the financial messaging apparatus 14 is further configured to only transmit the encapsulated financial message 60 if the priority of the encapsulated financial message 60 does not meet or exceed the priority threshold associated with the identified user.

In another example in which the actions stored in the encapsulated financial message 60 include a priority, a network protocol that the network interface 26 of the financial messaging apparatus 14 uses to transmit the encapsulated financial message 60 to a user depends on the priority of the encapsulated financial message 60. For example, the network protocol used to transmit an encapsulated financial message having a high priority is a push notification. As will be understood by one of ordinary skill in the art, the network protocol used to transmit a high priority encapsulated financial message 60 is not limited to push notification but may be TCP/IP, Bluetooth, SMTP, HTTP, SSL, PPP, IMAP, or any other suitable network protocol.

Priority of an encapsulated financial message 60 may refer to the arrangement of the financial messages 62 received by a user. That is, priority may refer to the place of a given financial message 62 in a queue of financial messages to be displayed to a user. Alternatively or additionally, priority may also refer to whether a financial message 62 is shown to a user. For example, if a message has a low priority, the message may not be displayed to a user.

In still another example, the actions 64 stored in the encapsulated financial message 60 may include an error flag identifying the financial message 62 stored in the encapsulated financial message 60 as containing information regarding an error. In this example, the financial message 62 stored in the encapsulated financial message 62 that contains the error flag may be automatically displayed to the identified user upon receiving the encapsulated financial message 60.

Turning back to FIG. 2, the mobile device 18 receives the encapsulated financial message 60 from the financial messaging apparatus 14 via the network interface 44. The processor 40 of the mobile device 18 is configured to (1) determine the action(s) stored in the received encapsulated financial message 60 and (2) perform the determined action(s).

In one embodiment, the non-transitory computer readable medium 36 of the mobile device 18 stores a requirement database 43. The requirement database 43 stores requirements specifying an operation to be performed based upon characteristic(s) of the received encapsulated financial messages 60. Prior to performing the action(s) stored in the encapsulated financial message 60, the processor 40 of the mobile device 18 analyzes the received encapsulated financial message 60 to identify characteristic(s) of the received encapsulated financial message 62. The processor 40 of the mobile device 18 also identifies operation(s) in the requirement database 43 matching identified characteristic(s) of the received encapsulated financial message 62. The processor 40 of the mobile device 18 may only perform the action(s) contained in the encapsulated financial message 60 if the action does not conflict with the operation identified in the requirement database 43.

Returning to FIG. 3, the processor 40 of the mobile device 18 may also be configured to update the encapsulated financial message 66 by including action information 68 in the encapsulated financial message 60. The updated encapsulated financial message 66 may include all of the information included in the encapsulated financial message 60 along with additional information (e.g., action information 68). Alternatively, the updated encapsulated financial message 66 may not contain all of the information contained in the encapsulated financial message 60. That is, some of the information contained in the encapsulated financial message 60 (e.g., one or more of the actions) may be removed from the updated encapsulated financial message 66.

The action information 68 identifies an operation regarding the financial message 62 of the encapsulated financial message 60. The action information 68 may additionally identify a result of the action(s) 64 being performed or a notification indicating whether the action(s) 64 were performed.

For example, the requirement database 43 may store a duplicate requirement specifying that the priority of financial messages 62 that have already been displayed is modified. If the processor 40 of the mobile device 18 identifies the encapsulated financial message 60 as a duplicate message, the processor 40 first modifies the priority of the received duplicate financial message 62 included in the encapsulated financial message 60. That is, the priority of the financial message 62 is modified based on the requirement stored in the requirement database 43 independent of any action 64 stored in the encapsulated financial message 60. The processor 40 also updates the encapsulated financial message 66 to include action information 68 identifying that the priority of the financial message 62 in the encapsulated financial message 60 was modified.

Updating the encapsulated financial message 60 may only include adding action information 68 to the encapsulated financial message 60. Alternatively, as described above, information may also be removed from the encapsulated financial message 60. The updated encapsulated financial message 66 may have the same format as the encapsulated financial message 60. Alternatively, the updated encapsulated financial message 66 may have a different format than the encapsulated financial message 60. For example, the updated encapsulated financial message 66 may include an additional file including the action information 68 that is separate from the encapsulated financial message 60. In this example, the updated encapsulated financial message 66 comprises the combined separate file containing the action information 68 and the encapsulated financial message 60.

Returning to FIG. 4, after updating the encapsulated financial message 66 to include action information 68, the network interface 44 of the mobile device 18 transmits the updated encapsulated financial message 66 to the financial message apparatus 14. The network interface 44 of the financial message apparatus 14 receives the updated encapsulated financial message 66 from the mobile device 18.

Upon receiving the updated encapsulated financial message 66, the financial messaging apparatus 14 may transfer a financial message 62 regarding the contents of the updated encapsulated financial message 66 to a banking system 12. The financial messaging apparatus's 14 response to a received updated encapsulated financial message 66 may depend upon the action information 68 contained in the updated encapsulated financial message 66. For example, the non-transitory computer readable medium 24 of the financial messaging apparatus 14 may include a response database 50 storing responses specifying a response action to be performed based upon action information. In this example, the processor 22 of the financial messaging apparatus 14 analyzes the received updated encapsulated financial message 66 to identify action information 68. Upon identifying action information 68, the processor 22 identifies and performs response(s) in the response database that match the identified action information 68.

For example, the financial 62 message in the encapsulated financial message 60 may indicate a violation. The action 64 included in the received encapsulated financial message 60 may indicate displaying the financial message 62 in the encapsulated financial message 60 and request user input identifying a fix of the violation. The processor 40 of the mobile device 18 causes the financial message 62 to be displayed and receives user input identifying an identified fix of the violation. The processor 40 updates the encapsulated financial message 60 to include action information 68 identifying the identified fix and that the encapsulated financial message 60 was updated by the mobile device 18. The network interface 44 of the mobile device 18 transmits the updated encapsulated financial message 60 to the financial message apparatus 14.

In one embodiment, the response database 50 stores an identifier response. For example, the received action information 68 may specify a device identifier for the mobile device 18. Action information 68 contained in the updated encapsulated financial message 66 may be discarded or ignored if the device identifier is not contained in an approved device list. For example, the device identifier may be a MAC address, serial number, or other unique identifier of the device. If the processor 22 of the financial message apparatus 14 identifies that the received updated encapsulated financial message 66 includes action information 68 regarding a fix to a violation and that the updated encapsulated financial message 68 was updated by a device that is not listed in the approved device list, then the processor 22 of the financial message apparatus 14 causes the received updated encapsulated financial message 68 to be stored containing information identifying that the fix in the received updated encapsulated financial message 66 was not accepted because it was issued from an unimproved device. In one example, no mobile device is included in the approved device list. In this way, the financial messaging apparatus 14 will not accept any fix to a violation received from a mobile device 18.

As shown in FIG. 1 and described above, a relay server 15 may be used to pass encapsulated financial messages 60 between the financial messaging apparatus 14 and the network 16. The relay server 15 includes a network interface 36 that receives the encapsulated financial message 60 from the financial message apparatus 14 and transmits the encapsulated financial message 60 to the identified user after receiving information regarding the identified user. The relay server 15 additionally includes a processor 40. The processor 40 accesses the action(s) 64 included in the encapsulated financial message 60 and analyzes the action for a restriction on routing of the encapsulated financial message. The relay server 15 may be prohibited from accessing other information contained in the encapsulated financial message 60 (e.g., the financial message 62). If the action(s) 64 do not contain at least one routing restriction, the processor 40 causes the network interface 36 to transmit the encapsulated financial message to the identified user. If the action(s) 64 contain routing restriction(s), the processor 40 determines if the received information regarding the identified user conflicts with the routing restriction(s). If the received information regarding the identified user does not conflict with the routing restriction(s), the processor 40 causes the network interface 44 to transmit the encapsulated financial message 60 to the identified user. If the received information regarding the identified user conflicts with the routing restriction(s), the processor 40 prevents the network interface 44 from transmitting the encapsulated financial message 60 to the identified user.

The information received regarding the identified user may include the telephone number, email address, IP address, or any other suitable identifier that allows the relay server 15 to pass the received encapsulated financial message 60 to the identified user.

Figures 5A, 5B:
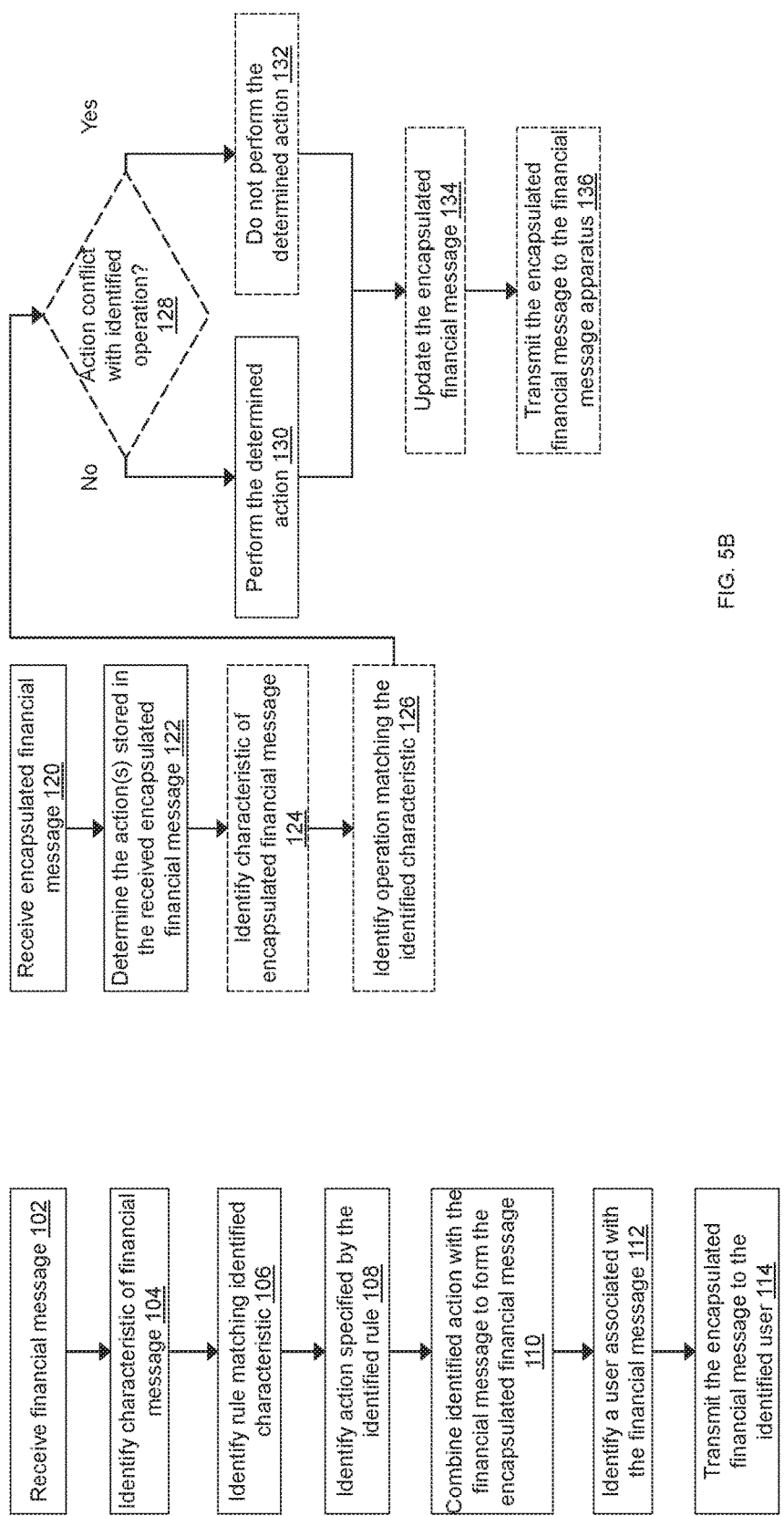
FIG. 5A is flow diagram representing a method for encapsulating a financial message.
FIG. 5B is a flow diagram representing processing of the encapsulated financial message of FIG. 5A by a mobile device.

Turning to FIG. 5A, a method for encapsulating a financial message is shown. The steps of the method may be performed by the processor 22 of the financial messaging apparatus 14. In processing block 102, a financial message 62 generated by a bank is received. In processing block 104, the received financial message 62 is analyzed to identify at least one characteristic of the received financial message. In processing block 106, at least one rule in a rule database 30 is identified that matches at least one of the identified characteristic(s) of the received financial message 62. In processing block 108, an action specified by the identified rule is determined. In processing block 110, at least one action specified by the identified at least one rule is combined with the financial message 62 to form an encapsulated financial message 60. In processing block 112, a user associated with the received financial message 62 is identified. In processing block 114, the encapsulated financial message 60 is transmitted to the identified user.

Turning to FIG. 5B, a method for updating the encapsulated financial message 60 is shown. The method steps may be performed by the processor 40 of the mobile device 18. In process block 120, the encapsulated financial message 60 is received. In process block 122, the action(s) 64 stored in the received encapsulated financial message 60 are determined. In optional process block 124, a characteristic of the encapsulated financial message 60 is determined. In optional process block 126, an operation matching the identified characteristic is determined. In optional decision block 128, a check is performed to determine if the action(s) 64 conflict with the identified operation(s). If there is no conflict (or if the optional check in step 128 is not performed), then the action(s) are performed in process block 130. If there is a conflict and the optional check was performed in block 128, then in optional processing block 132 the action(s) are not performed. Following processing block 130 and 132, the encapsulated financial message 60 is updated in optional process block 134. In optional process block 136, the updated encapsulated financial message 60 is transmitted to the financial messaging apparatus 14.

Figure 5C:
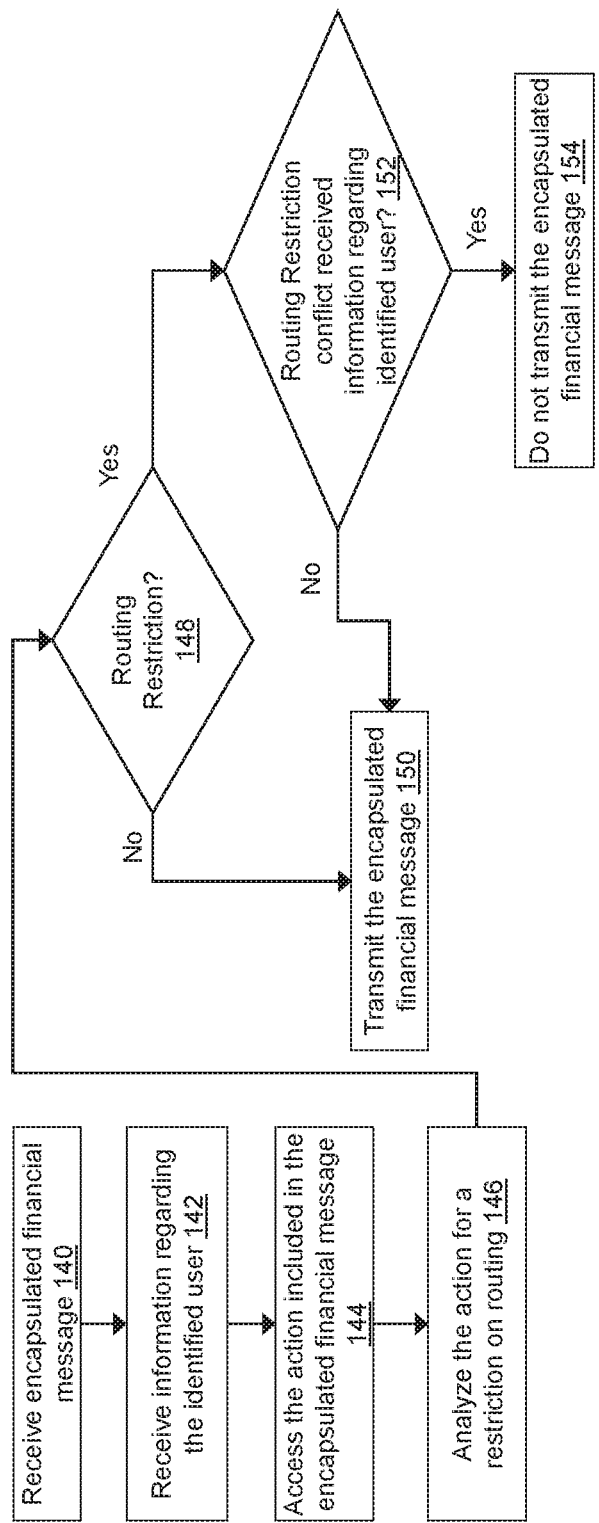
FIG. 5C is a flow diagram representing transmission of the encapsulated financial message of FIG. 5A by a relay server.

Turning to FIG. 5C, a method for routing financial messages 62 is shown. The method may be performed by the processor 32 of the relay server 15. In process block 140, the encapsulated financial message 140 is received. In process block 142, information regarding the identified user is also received. The encapsulated financial message 140 and the information regarding the identified user may be received together, e.g., in a single data structure or as part of a single network transmission. Single network transmission may refer to the encapsulated financial message 60 and user information be received consecutively (i.e., one after the other or shortly thereafter). In process block 144, the action(s) 64 included in the encapsulated financial message 60 are accessed. In process block 146, the action(s) 64 are analyzed for a restriction on routing. If a routing restriction is not found in decision block 148, then the encapsulated financial message 60 is transmitted in process block 150. Alternatively, if a routing restriction is found in decision block 148, then a check is performed in decision block 152 to determine if the routing restriction conflicts with received information regarding the identified user. For example, if the routing restriction specifies that the message may not be sent outside of the United States and the received information states that the identified user is located in Europe, then there is a conflict. If there is a conflict found in block 152, then the encapsulated financial message 62 is not transmitted to the identified user in process block 154. Alternatively, if a conflict is not found in block 152, then the encapsulated financial message 150 is transmitted to the user in process block 150.

As will be understood by one of ordinary skill in the art, the processors 22, 32, 40 of the financial messaging apparatus 14, relay server 15, and mobile device 18 may have various implementations. For example, each of the processors 22, 32, 40 may include any suitable device, such as a programmable circuit, integrated circuit, memory and I/O circuits, an application specific integrated circuit, microcontroller, complex programmable logic device, other programmable circuits, or the like. Each of the processors 22, 32, 40 may also include a non-transitory computer readable medium, such as random access memory (RAM), a read-only memory (ROM), an erasable programmable read-only memory (EPROM or Flash memory), or any other suitable medium. Instructions for performing the methods described above may be stored in the non-transitory computer readable medium and executed by the respective processor 22, 32, 40 identified in the description of the method. Each of the processors 22, 32, 40 may be communicatively coupled to the respective computer readable medium 24, 34, 42 and network interface 26, 36, 44 through a system bus, mother board, or using any other suitable structure known in the art.

The network interfaces 26, 36, 44 of the financial messaging apparatus 14, relay server 15, and mobile device 18 may each be communicatively coupled to one or more mobile devices 18 and banking systems 12 via a network 16. The network 16 may be an open network, such as the Internet, a private network, such as a virtual private network, or any other suitable network. Each of the network interface 26, 36, 44 may be configured to receive financial messages 62, encapsulated financial message 60, and update encapsulated financial messages 66. The financial messages 62, encapsulated financial message 60, and update encapsulated financial messages 66 may each be an electronic file including (in addition to the data described above) information regarding the identified user, creator of the financial message 62, and/or any other suitable information needed by the financial messaging apparatus 14, banking systems 12, relay server 15, and mobile devise 18.

As will be understood by one of ordinary skill in the art, each of the network interfaces 26, 36, 44 may comprise a wireless network adaptor, an Ethernet network card, or any suitable device for performing network based communication between devices. Each of the network interface 26, 36, 44 may be communicatively coupled to the respective computer readable medium 24, 34, 42 such that each network interface 26, 36, 44 is able to send data stored on the respective computer readable medium 24, 34, 42 across the network 15 and store received data on the respective computer readable medium 24, 34, 42. Each of the network interface 26, 36, 44 may also be communicatively coupled to the respective processor 22, 32, 40 such that the processor is able to control operation of the network interface 26, 36, 44. The respective network interfaces 26, 36, 44, computer readable medium 24, 34, 42, and processors 22, 32, 40 may be communicatively coupled through a system bus, mother board, or using any other suitable manner as will be understood by one of ordinary skill in the art.

Although the invention has been shown and described with respect to certain exemplary embodiments, it is obvious that equivalents and modifications will occur to others skilled in the art upon the reading and understanding of the specification. It is envisioned that after reading and understanding the present invention those skilled in the art may envision other processing states, events, and processing steps to further the objectives of system of the present invention. The present invention includes all such equivalents and modifications, and is limited only by the scope of the following claims.

What is claimed is:

1. A financial messaging apparatus configured to encapsulate a financial message, the apparatus comprising:
a network interface configured to receive a financial message generated by a bank;
a non-transitory computer readable medium configured to store a rule database, wherein the rule database includes rules specifying actions to be added to financial messages based upon characteristics of the financial messages;
a processor configured to:
analyze the received financial message to identify at least one characteristic of the received financial message;
identify at least one rule in the rule database matching at least one of the at least one identified characteristics of the received financial message;
combine at least one action specified by the identified at least one rule with the financial message to form an encapsulated financial message; and
identify a user associated with the received financial message; and
the network interface further configured to transmit the encapsulated financial message to the identified user, wherein:
the action stored in the encapsulated financial message includes a routing rule specifying criteria for routing of the encapsulated financial message;
the routing rule specifies at least one prohibited location for routing the encapsulated financial message through;
the encapsulated financial message is prevented from being routed through the at least one prohibited location; and
the network interface does not transmit the encapsulated financial message through the at least one prohibited location.

2. The apparatus of claim 1, wherein the actions stored in the encapsulated financial message include an access rule specifying criteria for accessing the financial message stored in the encapsulated financial message.

3. The apparatus of claim 2, wherein the access rule prevents the financial message stored in the encapsulated financial message from being accessed unless a location of a receiver of the encapsulated financial message is within a specified geo-location.

4. The apparatus of claim 1, wherein:
the network interface transmits the encapsulated financial message to a relay server as part of transmitting the encapsulated financial message to the identified user; and
the access rule contains information configured to prevent the relay server from transmitting the encapsulated financial message outside of a specified geo-location contained in the access rule.

5. The apparatus of claim 4, wherein the specified geo-location is the United States of America.

6. The apparatus of claim 1, wherein the actions stored in the encapsulated financial message include a duplicative message rule specifying that a priority of the encapsulated financial message is updated if the financial message stored in the encapsulated financial message has already been displayed to the identified user.

7. The apparatus of claim 1, wherein:
the actions stored in the encapsulated financial message include a duplicative message rule specifying that a priority of the encapsulated financial message is modified if the financial message stored in the encapsulated financial message has already been transmitted to the identified user; and
the non-transitory computer readable medium additionally includes a previous message database identifying the transmitted financial message that have been previously sent to the identified user.

8. The apparatus of claim 1, wherein a priority of the encapsulated financial message is increased if the financial message stored in the encapsulated financial message has already been transmitted to the identified user.

9. The apparatus of claim 1, wherein the actions stored in the encapsulated financial message include a priority and the financial message stored in the encapsulated financial message is not displayed to the identified user upon receiving the encapsulated financial message if the priority of the encapsulated financial message does not meet or exceed a priority threshold of the identified user.

10. The apparatus of claim 1, wherein:
the actions stored in the encapsulated financial message include a priority;
the non-transitory computer readable medium additionally includes a user priority database identifying a priority threshold associated with the identified user; and
the network interface is further configured to only transmit the encapsulated financial message if the priority of the encapsulated financial message does not meet or exceed the priority threshold associated with the identified user.

11. The apparatus of claim 1, wherein:
the actions stored in the encapsulated financial message include a priority; and
a network protocol that the network interface uses to transmit the encapsulated financial message to a user depends on the priority of the encapsulated financial message.

12. The apparatus of claim 1, wherein the network protocol used to transmit an encapsulated financial message having a high priority is a push notification.

13. The apparatus of claim 1, wherein:
the actions stored in the encapsulated financial message include an error flag identifying the financial message stored in the encapsulated financial message as containing information regarding an error; and
the financial message stored in the encapsulated financial message is automatically displayed to the identified user upon receiving the encapsulated financial message.

14. The apparatus of claim 1, wherein the received financial message has a designated format and the designated format of the financial message is SWIFT or BACS.

15. A financial message system including the financial messaging apparatus of claim 1 and a mobile device, wherein:
the mobile device comprises:
a network interface configured to receive the encapsulated financial message from the financial messaging apparatus; and
a processor configured to:
determine the at least one action stored in the received encapsulated financial message; and
perform the determined at least one action.

16. The financial message system of claim 15, wherein:
the processor of the mobile device is further configured to:
update the encapsulated financial message by including action information in the encapsulated financial message, wherein the action information identifies an operation regarding the financial message of the encapsulated financial message; and
the network interface further configured to transmit the updated encapsulated financial message to the financial message apparatus; and the network interface of the financial message apparatus is further configured to receive the updated encapsulated financial message from the mobile device.

17. The financial message system of claim 16, wherein:
the financial message apparatus additionally comprises:
the non-transitory computer readable medium additionally configured to store a response database, wherein the response database stores at least one response specifying a response action to be performed based upon at least one action information in the received updated encapsulated financial messages;
the processor is further configured to:
analyze the received updated encapsulated financial message to identify at least one action information in the received updated encapsulated financial messages;
identify at least one response in the response database matching at least one of the at least one identified action information; and
perform the identified at least one response.

18. The financial message system of claim 17, wherein:
the financial message in the encapsulated financial message indicates a violation;
the action included in the received encapsulated financial message indicates displaying the financial message in the encapsulated financial message and requesting user input identifying a fix of the violation;
the processor of the mobile device:
causes the financial message in the encapsulated financial message indicating the violation to be displayed;
receives user input identifying an identified fix of the violation; and
updates the encapsulated financial message to include action information identifying the identified fix and that the encapsulated financial message was updated by the mobile device; and
the network interface of the mobile device transmits the updated encapsulated financial message to the financial message apparatus.

19. A financial message system including:
a financial messaging apparatus configured to encapsulate a financial message, the apparatus comprising:
a network interface configured to receive a financial message generated by a bank;
a non-transitory computer readable medium configured to store a rule database, wherein the rule database includes rules specifying actions to be added to financial messages based upon characteristics of the financial messages;
a processor configured to:
analyze the received financial message to identify at least one characteristic of the received financial message;
identify at least one rule in the rule database matching at least one of the at least one identified characteristics of the received financial message;
combine at least one action specified by the identified at least one rule with the financial message to form an encapsulated financial message; and
identify a user associated with the received financial message; and
the network interface further configured to transmit the encapsulated financial message to the identified user, wherein:
the action stored in the encapsulated financial message includes a routing rule specifying criteria for routing of the encapsulated financial message;

the routing rule specifies at least one prohibited location for routing the encapsulated financial message through;

the encapsulated financial message is prevented from being routed through the at least one prohibited location; and the network interface does not transmit the encapsulated financial message through the at least one prohibited location; and a mobile device comprising:

a network interface configured to receive the encapsulated financial message from the financial messaging apparatus; and a non-transitory computer readable medium configured to store a requirement database, wherein the requirement database stores at least one requirement specifying an operation to be performed based upon at least one characteristic of received encapsulated financial messages;

a processor configured to:

determine the at least one action stored in the received encapsulated financial message; and prior to performing the determined at least one action:

analyze the received encapsulated financial message to identify at least one characteristic of the received encapsulated financial message; and identify at least one operation in the requirement database matching at least one of the at least one identified characteristics of the received encapsulated financial message; and only perform the determined at least one action if the determined at least one action does not conflict with the identified at least one operation.

20. The financial message system of claim 19, wherein:

the requirement database stores a duplicate requirement specifying that a priority of financial messages already displayed is modified;

if the processor of the mobile device identifies the encapsulated financial message as a duplicate message, the processor of the mobile device:

modifies the priority of the received duplicate financial message included in the encapsulated financial message due to the duplicate requirement; and updates the encapsulated financial message to include action information identifying that the priority of the financial message in the encapsulated financial message was modified.

21. The financial message system of claim 19, additionally including a relay server, wherein:

the relay server comprises:

a network interface configured to:

receive the encapsulated financial message from the financial message apparatus;

transmit the encapsulated financial message to the identified user; and receive information regarding the identified user;

a processor configured to:

access the at least one action included in the encapsulated financial message;

analyze the at least one action for a restriction on routing of the encapsulated financial message;

if the at least one action does not contain at least one routing restriction, cause the network interface to transmit the encapsulated financial message to the identified user;

if the at least one action contains at least one routing restriction:

determine if the received information regarding the identified user conflict with the at least one routing restriction;

if the received information regarding the identified user does not conflict with the at least one routing restriction, cause the network interface to transmit the encapsulated financial message to the identified user; and if the received information regarding the identified user does conflict with the at least one routing restriction, prevent the network interface to transmit the encapsulated financial message to the identified user.

22. A method for encapsulating a financial message, the method including:

receiving a financial message generated by a bank;

analyzing the received financial message to identify at least one characteristic of the received financial message;

identifying at least one rule in a rule database matching at least one of the at least one identified characteristics of the received financial message, wherein the rule database is stored on a non-transitory computer readable medium and the rule database includes rules specifying actions to be added to financial messages based upon characteristics of the financial messages;

combining at least one action specified by the identified at least one rule with the financial message to form an encapsulated financial message, wherein:

the at least one action stored in the encapsulated financial message includes a routing rule specifying criteria for routing of the encapsulated financial message;

the routing rule specifies at least one prohibited location for routing the encapsulated financial message through;

the encapsulated financial message is prevented from being routed through the at least one prohibited location;

identifying a user associated with the received financial message; and transmitting the encapsulated financial message to the identified user, wherein:

the encapsulated financial message is not transmitted through the at least one prohibited location.

\* \* \* \* \*